Jan. 25, 1927.
A. T. LAWS
1,615,765
CREAM REMOVING DEVICE
Filed Nov. 14, 1924
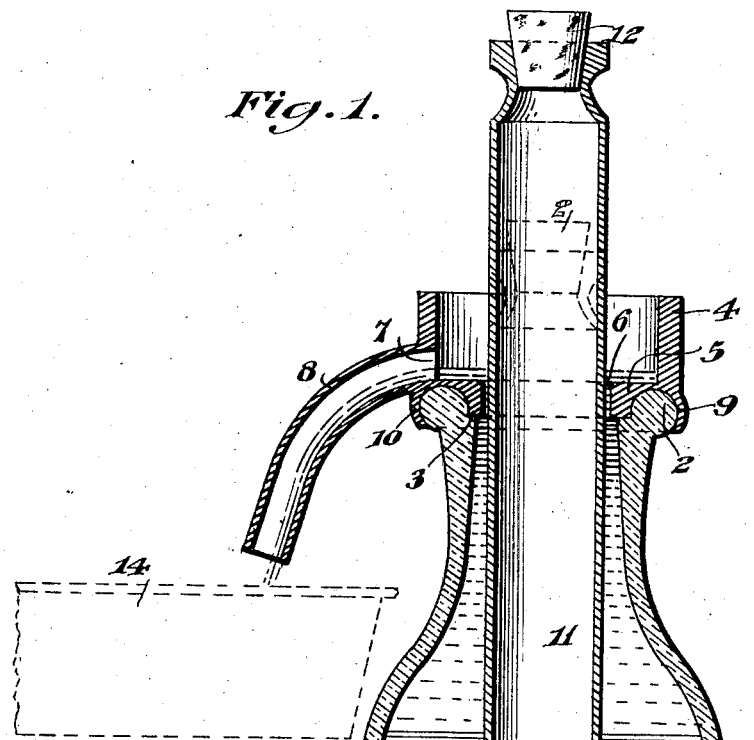
INVENTOR.
A. T. Laws,
BY
Geo. F. Kimmel, ATTORNEY.

Patented Jan. 25, 1927.

1,615,765

UNITED STATES PATENT OFFICE.

ANDREW T. LAWS, OF ST. HELENS, OREGON.

CREAM-REMOVING DEVICE.

Application filed November 14, 1924. Serial No. 749,944.

This invention relates to cream removing devices for use in conjunction with milk containers and has for its primary object the provision, in a manner as hereinafter set forth, of a device for removing cream from milk bottles by displacement of the cream contained therein by the use of a weighted plunger descending through a cap member secured to the top of the milk bottle.

The invention contemplates the provision of a circular relatively shallow receptacle, having an aperture through the central portion of the bottom thereof, and further having a tubular lead-off extending from one side thereof and opening into the interior. The underside of this receptacle has formed therein an annular groove, the bottom of the receptacle being of substantial thickness to provide for the formation of such groove, and into this groove the lip of a milk bottle is adapted to be inserted to tightly hold the receptacle in position upon the top of the bottle. The receptacle is preferably constructed of rubber and in view of this it will be seen that the outer wall of the groove formed in the bottom thereof will be resilient and act as a lip to tightly retain the receptacle in position and further setting up a leak-proof connection or joint between the lip of the milk bottle and the underside of the receptacle. Adapted for vertical reciprocation through the central aperture of the receptacle, is a plunger, in the form of a long cylindrical bottle, the upper end of this bottle plunger being closed by a stopper, and this bottle is adapted to have placed therein weight members which will cause it to sink through the milk in the bottle thereby displacing a considerable quantity of fluid and forcing the cream at the top of the milk up through the aperture in the bottom of the receptacle into the receptacle to flow out through the lead-off. The bottle plunger is of course of less diameter than the diameter of the aperture in the bottom of the receptacle, to allow for sufficient space for the escape of the displaced cream.

A further and final object of this invention is the provision, in a manner as hereinafter set forth, of a device for removing cream from a receptacle by displacement, of light construction, unique and attractive in appearance, durable, easily kept clean and sanitary, and inexpensive to manufacture.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claims.

In the drawings:

Figure 1 shows the device embodying this invention, in longitudinal section and applied to a milk bottle, which bottle is in longitudinal section.

Figure 2 is a plan view of the cream receiving receptacle and the lead-off spout of the device, the plunger being removed therefrom.

Referring to the drawings in detail wherein like numerals of reference indicate corresponding parts throughout the views, there is indicated by the numeral 1 a milk bottle of conventional construction, which bottle is constricted at its upper end and is provided with the usual lip or bead 2 about the mouth thereof. The mouth of the bottle is provided with the usual ledge 3 against which the closure disc commonly used for bottles of this type, seats.

The device embodying this invention comprises a receptacle 4, preferably round and relatively shallow as shown. This receptacle has a relatively thick bottom 5 therein through which there is formed a concentric aperture 6.

The wall of the receptacle 4 is provided with an outlet aperture 7, the lower edge of which aperture, is flush with the bottom of the receptacle, as shown, and formed integrally with the outer face of the wall of the receptacle and aligned with the aperture 7 is an outwardly and downwardly directed lead-off tube or pipe 8.

Formed in the underside of the bottom 5 of the receptacle, is an annular groove 9 and the outer wall 10 of this groove is relatively thin and continues downward a slight distance below the under surface of the bottom 5, as clearly shown in Figure 1.

The lip 2 of the milk bottle is adapted to be inserted in this groove 9 in the underside of the receptacle 4, as shown, and in this manner, the receptacle is tightly and securely held in position upon the top of the milk bottle.

It is preferred that this receptacle be formed of rubber and in such construction any irregularities in the curvature of the lip 2 can be overcome for the resilient lip 10 can be deformed to overcome these irregularities and make a tight connection. The bottom 5 of the receptacle, as shown, seats upon the flange 3 of the bottle and extends over the edge thereof and this positioning of the inner side of the receptacle in conjunction with the gripping action of the lip 2 of the bottle, serves to clamp the receptacle securely in position and set up a fluid-tight joint between the parts.

Adapted to extend through the aperture 6 in the bottom of the receptacle, is an elongated tubular bottlelike plunger 11, which plunger is hollow as shown, closed at its bottom and having the upper end slightly constricted to form a mouth and closed by means of the cork 12. This plunger 11 is adapted to reciprocate vertically through the aperture 6 and there is placed within the plunger weight elements 13 which may be increased or decreased in number according to the size of the bottle upon which the device is used and according to the density of the liquid within the bottle, to cause the plunger to descend into the liquid and displace the same, forcing it through the aperture 6 and into the receptacle 4 where it will flow off through the tube 8. It is of course understood that the plunger 11 is of sufficiently less diameter than the aperture 6 to allow the proper amount of space for the passage of the displaced cream through the aperture 6.

The operation of this cream remover is as follows:

After the milk bottle has been uncovered, the receptacle 4, having the plunger 11 removed therefrom, is positioned over the mouth of the milk bottle and the annular groove 9 is forced down over the lip of the bottle until the lip 10 of the receptacle engages the bead 2 to securely hold the receptacle in position. One or two weight members 13 are then placed within the plunger 11, and the same inserted through the aperture 6 in the floor 5 of the receptacle, the plunger meanwhile being so held that it will slip easily through the hand. Additional weight members 13 are then dropped into the plunger until a sufficient number has been inserted to cause the plunger to sink into the body of the milk and cream, whereupon the cork 12 may be placed in the plunger and the same released and allowed to slip slowly down through the aperture 6, thereby displacing the fluid within the bottle and forcing the cream up through the aperture 6 to flow out through the tube 8 into the container 14. If the device is to be used on bottles of the same size at all times, the weight members 13 may be left in the plunger 11 so that the device will always be ready for use when wanted.

From the foregoing description it will be seen that there has been provided a novel and unique cream removing device, extremely simple to operate, and at the same time very efficient as all of the cream which has risen to the top of the bottle of milk may be completely removed therefrom without stirring up the contents of the bottle.

Having thus described my invention what I claim is:

In a cream remover of the character described, an annular straight walled receptacle of rubber having a relatively thick centrally apertured bottom, said bottom having an annular groove formed therein adapted to engage over the lip of a milk bottle, positioning the aperture in the bottom over the bottle mouth, a lead-off tube leading through and extending from the wall of said receptacle from the surface of the bottom thereof, and an elongated hollow bottle like plunger of equal diameter throughout and of less diameter than, and adapted to extend through, said aperture, said plunger having the upper end constricted and open and adapted to receive a stopper after the insertion of weight elements into the plunger, therethrough.

In testimony whereof, I affix my signature hereto.

ANDREW T. LAWS.